United States Patent

Ortynski

[15] 3,638,843
[45] Feb. 1, 1972

[54] WEARABLE FISHERMAN'S LURE AND FLY CARRIER

[72] Inventor: Samuel J. Ortynski, 9717 Dedaker St., Philadelphia, Pa. 19115

[22] Filed: Oct. 7, 1970

[21] Appl. No.: 78,665

[52] U.S. Cl. .................................................224/5 G, 206/16 R
[51] Int. Cl. .................................................................A45f 5/00
[58] Field of Search .....................224/26 R, 26 B, 26 J, 5 R, 224/5 A, 5 B, 5 G; 206/16 R

[56] References Cited

UNITED STATES PATENTS

| | | | |
|---|---|---|---|
| 3,151,790 | 10/1964 | Mavrakis | 224/5 G |
| 3,277,599 | 10/1966 | Griffeth | 224/5 G |

*Primary Examiner*—Gerald M. Forlenza
*Assistant Examiner*—Jerold M. Forsberg

[57] ABSTRACT

A carrier for holding lures and flies has a box divided into compartments, and is received in an open top holder which has a backwall, a shorter front wall and sidewalls. The box is slidably secured in the holder through pins cooperating with elongated slots in the sides of the holder. Remote from the pins, the box has an outfolding lid hinged thereto and stops below the hinges so that the lid can serve as a horizontally disposed handling surface. Belt receiving slots are provided in the sidewalls of the holder adjacent the backwall for slidably receiving a belt secured to the wearer. The respective dimensions of the box and holder define a space therebetween which provides a sliding channel for the belt.

6 Claims, 4 Drawing Figures

PATENTED FEB 1 1972 3,638,843

INVENTOR.
SAMUEL J. ORTYNSKI

WEARABLE FISHERMAN'S LURE AND FLY CARRIER

My invention deals with a compact, wearable, compartmented carrier assembly adapted to be worn by attachment to a fisherman's belt, and designed to contain flies, lures, and like fishing equipment.

I have observed that many adjustments of fishing tackle and lures often are necessary during the course of a day of fishing. Often times, these are required when the fisherman is standing in water where there is no place to lay down his rod or otherwise free his hands for the work needed. This problem is not always resolved satisfactorily by merely going ashore or by holding the rod under an arm since a work surface is still required for attaching and detaching equipment from the fishing line.

Heretofore carriers or containers designed to solve the above problems, such as those described in U.S. Pat. Nos. 3,148,811 and 3,317,097, have been characterized by complexities of construction and a multiplicity of component parts which have discouraged their widespread acceptance by fishermen.

Accordingly, my invention has for its main object to provide inexpensive, wearable carrier means for storing and handling equipment while fishing.

Another object of my invention is to provide a carrier for lures and the like which has an easily opened, compartmented, cover unit equipped with an outfolding lid suitable as a work surface.

Other objects of my invention will in part be obvious and in part hereinafter pointed out.

My invention accordingly consists in the features of construction, combination of elements, and arrangements of parts which will be exemplified in the construction hereinafter described and of which the scope of application will be indicated in the following claims.

In the accompanying drawing, there is shown of the possible embodiments of my invention:

In FIG. 1, a perspective view of the carrier open;

in FIG. 2, a perspective view of the carrier in closed position;

Figure 1:
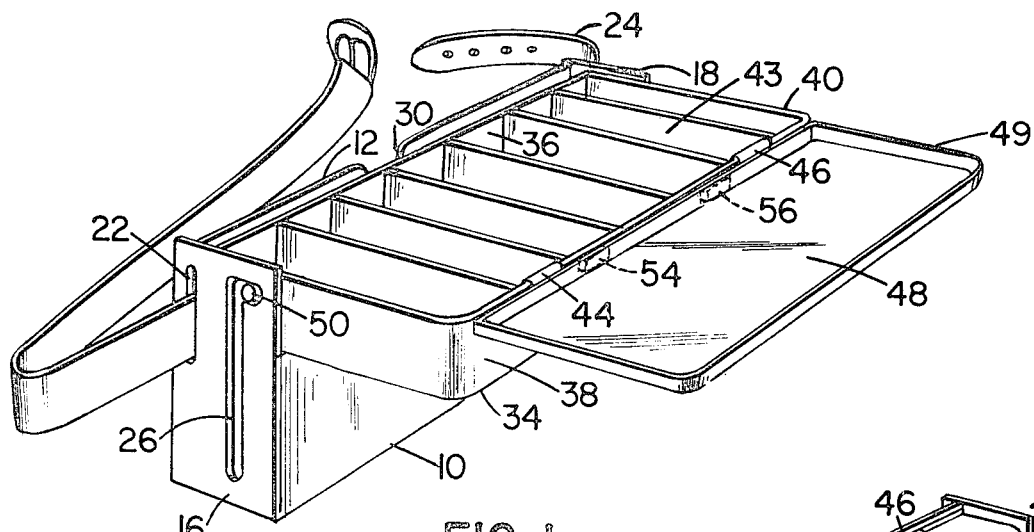
Figure 2:
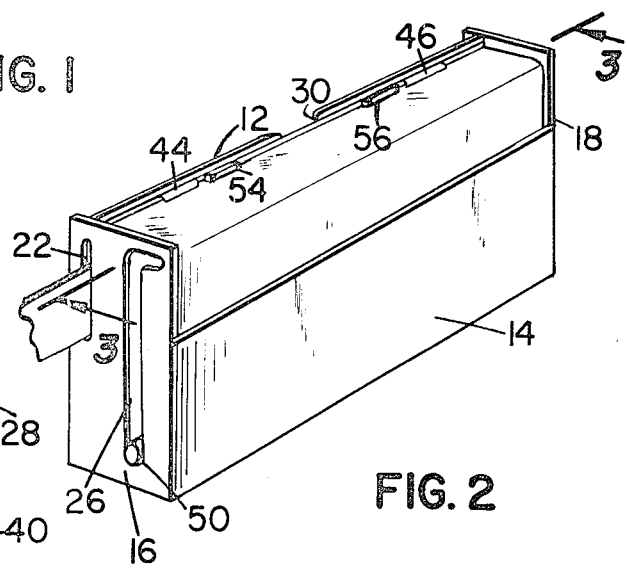

Referring in detail to the various views of the drawing, FIG. 1 shows one form of the invention with the holder generally designated at 10. This holder 10, formed of light metal such as stainless steel, wood or plastic, has a backwall 12, a shorter front wall 14, connecting sidewalls 16 and 18 and a bottom 20. The entire holder may be made integrally by molding or the constituent parts may be welded or otherwise secured. Sidewalls 16 and 18 have slots 22 which are in register with one another and a belt 24 passes therethrough. This belt may be the wearer's belt or some other belt as desired. These sidewalls also have matching inverted L-shaped slots 26 and 28.

The holder's backwall 12 has a central notch 30 of a depth such as to allow passage of a fingertip.

Figure 3:
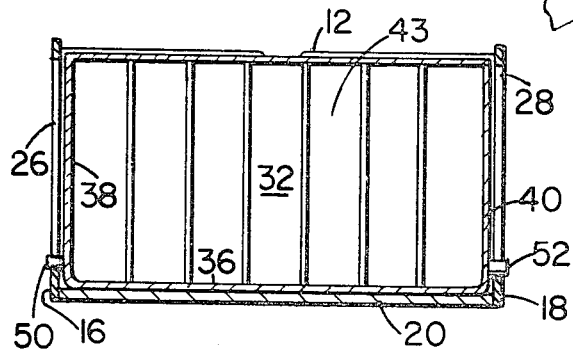
FIG. 3 is a sectional view of the assembly taken along lines 3—3 of FIG. 2.
Figure 4:
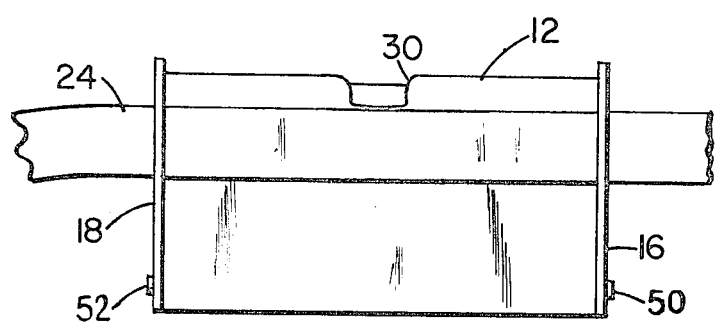
FIG. 4 is an elevational view of the holder's back.

The generally rectangular container unit or box 32, better seen in FIGS. 1 and 3, preferably is made of transparent, reasonably flexible plastic. It is composed of bottom 34, backwall 36, sidewalls 38 and 40, front wall, and compartments 43. HInged to front wall by hinges 44 and 46 is outwardly opening lid 48 which has closing rim 49 forming snap-on releasable locking means over box 32. A pair of stops 54 and 56 are mounted under the hinges to prevent the lid from assuming a vertical position when open. In this way, lid 48 can serve as a horizontal work surface. Sidewalls 38 and 40 have stop pins 50 and 52 preferably near their upper part which are received in the inverted L-shaped slots 26 and 28, respectively, and allow the box to slide in and out of the holder.

The space between the extremity of the box 32 and holder wall 12 serves as a sliding channel for belt 22 to facilitate moving the assembly.

In operation, the box 32 in whose compartments may be placed any fishing implement, is pulled out of the holder by grasping with the fingers of one hand. One finger grabs the back of the box through slot 30 and another seizes the front. The box is then pulled up and out by pivoting pins 50 and 52 in their pivotal connection in the upper extremity of slots 26 and 28. It is then allowed to rest for support on the top of front wall 14. This feature of the invention gives great stability to the box. Lid 48 is lifted open and allowed to rest on stops 54 and 56 so that it projects outwardly from the box and makes the interior of the box accessible. This arrangement provides a stable working surface which can be used to hold and support flies or bait while they are being put on the line.

Advantage is taken of the resilient nature of the plastic used to make the box to insert it and remove it from the holder. To do this, it suffices to compress the ends of it so as to insert pins 50 and 52 in slots 26 and 28.

It will thus be seen that there is provided a device in which the several objects of my invention are realized and which is well adapted to meet the practical conditions of actual use.

As various possible embodiments might be made of my invention and as various changes might be made in the embodiment above set forth, it is to be understood that all matter herein described or shown in the accompanying drawing is to be interpreted as illustrative and not in a limiting sense.

Having thus disclosed my invention, what I claim is:

1. A lure and fly carrier adapted to be slidably supported on a wearer's belt, comprising:

an open top holder having sidewalls, a backwall and a shorter front wall, openings in said sidewalls adjacent said backwall for slidably receiving said belt;

a container fitting in said holder, pivotally connected therewith and adapted to be withdrawn therefrom by outwardly pulling thereon and by being downswung about the pivotal connection to rest on the top of said front wall of said holder to lie thereon in a horizontally outwardly projecting position;

a top closure for said container, a hinged connection therebetween remote from said pivotal connection and adapted to be opened by being pulled upwardly and outwardly from said container;

stop means on said container below said hinged connection for locking said top closure in a horizontal position so that the same can serve as a work surface;

a space forming a sliding channel for said belt between said backwall of said holder and said top closure when said container lies within said holder, said space being also provided between the back of said container and said backwall when said container is in operative position.

2. The carrier according to claim 1, wherein said pivotal connection included matching slots of inverted L-configuration in said sidewalls of said holder and pins extending from said sidewall of said container.

3. The carrier according to claim 1 wherein said backwall of said holder has a slot for grasping said container.

4. The carrier according to claim 1, wherein said top closure has a downwardly projecting peripheral rim adapted to snap on and overlie the container.

5. The carrier according to claim 1, wherein said container and said closure are transparent.

6. The carrier according to claim 1, wherein said container has a plurality of compartments.

* * * * *